United States Patent
Gerweck et al.

(10) Patent No.: US 10,929,361 B2
(45) Date of Patent: Feb. 23, 2021

(54) RULE-BASED DATA SOURCE SELECTION

(71) Applicant: AtScale, Inc., San Mateo, CA (US)

(72) Inventors: Sarah Gerweck, Santa Clara, CA (US); DaRen Drummond, Redwood City, CA (US); Matthew Baird, Belmont, CA (US)

(73) Assignee: AtScale, Inc., San Mateo, CA (US)

( * ) Notice: Subject to any disclaimer, the term of this patent is extended or adjusted under 35 U.S.C. 154(b) by 256 days.

(21) Appl. No.: 15/657,195

(22) Filed: Jul. 23, 2017

(65) Prior Publication Data

US 2019/0026322 A1 Jan. 24, 2019

(51) Int. Cl.
*G06F 16/21* (2019.01)
*G06F 16/215* (2019.01)
*G06F 16/23* (2019.01)
*G06F 16/28* (2019.01)
*G06Q 30/02* (2012.01)

(52) U.S. Cl.
CPC ........ *G06F 16/215* (2019.01); *G06F 16/2379* (2019.01); *G06F 16/283* (2019.01); *G06Q 30/02* (2013.01)

(58) Field of Classification Search
CPC .................................................... G06F 16/215
USPC ......................................................... 707/802
See application file for complete search history.

(56) References Cited

U.S. PATENT DOCUMENTS

| | | | |
|---|---|---|---|
| 6,684,207 B1 | 1/2004 | Greenfield et al. | |
| 8,010,554 B1 | 8/2011 | Zhou | |
| 9,600,554 B2 | 3/2017 | Gerweck et al. | |
| 9,824,133 B1* | 11/2017 | Kalki | G06F 16/283 |
| 2004/0236767 A1 | 11/2004 | Soylemez et al. | |
| 2005/0278290 A1 | 12/2005 | Bruce | |
| 2007/0208721 A1 | 9/2007 | Zaman | |
| 2009/0018996 A1* | 1/2009 | Hunt | G06Q 30/02 |
| 2009/0249125 A1 | 10/2009 | Bhatawdekar et al. | |
| 2011/0252049 A1 | 10/2011 | Marinescu et al. | |

(Continued)

OTHER PUBLICATIONS https://451research.com/report-short?entityId=92407, 451 Research Impact Report, "Kyvos adds SQL support, availability on Google Cloud for OLAP-on-Hadoop" May 8, 2017, 1 page.

(Continued)

*Primary Examiner* — Syling Yen
(74) *Attorney, Agent, or Firm* — Armis IP Law, LLC

(57) ABSTRACT

Techniques are presented for rule-based selection of alternate data sources for multidimensional data statements. A virtual multidimensional data model is implemented to represent datasets that are accessed at various data sources. Derivative cubes generated from the virtual multidimensional data model are structured to have a respective data source metadata layer that is populated at data statement execution time to identify a target data source. Data source selection rules are established to map the attributes of data statements to target data sources. The data source selection rules are evaluated subject to data statement attributes derived from detected data statements to dynamically select target data sources for the data statements. The derivative cubes codify, in their respective data source metadata layers, a unique set of data source attributes identifying the target data sources. The derivative cubes are accessed to facilitate execution of the data statements on datasets at the target data sources.

23 Claims, 11 Drawing Sheets

(56) References Cited

U.S. PATENT DOCUMENTS

| | | |
|---|---|---|
| 2012/0089564 A1 | 4/2012 | Bakalash et al. |
| 2012/0102453 A1 | 4/2012 | Patch et al. |
| 2015/0278334 A1* | 10/2015 | Gerweck ............... G06F 16/283 707/706 |
| 2017/0213257 A1* | 7/2017 | Murugesan ........ G06Q 30/0277 |

OTHER PUBLICATIONS https://www.slideshare.net/AtulSharma225/kyvos-insights-datasheet-60646546 "Kyvos insights", Apr. 8, 2016, 2 pages.
International Preliminary Report & Written Opinion of PCT Application No. PCT/US2015/0022082, dated Jun. 25, 2015, 3 pages total.
International Search Report & Written Opinion of PCT Application No. PCT/US2016/031684, dated Oct. 19, 2016, 6 pages total.
https://www.ibm.com/support/knowledgecenter/en/ssw_i5_54/rzajq/rzajqdispatcher.htm, "Query Dispatcher", downloaded May 2, 2017, 1 page.

* cited by examiner

RULE-BASED DATA SOURCE SELECTION

FIELD

This disclosure relates to data analytics, and more particularly to techniques for rule-based data source selection.

BACKGROUND

Every day, sometimes every hour, there emerge more and more datasets that can be queried to acquire new, up-to-date information that can be used to develop business intelligence (BI). Indeed, with the continued proliferation of information sensing devices (e.g., mobile phones, online computers, RFID tags, sensors, etc.), increasingly larger volumes of data are collected for various business intelligence purposes. For example, the web browsing activities of online users are captured in various datasets (e.g., cookies, log files, etc.) that are used by online advertisers in targeted advertising campaigns.

Datasets from operational systems (e.g., point of sale systems, accounting systems, CRM systems, etc.) can be combined with online datasets. Relying on traditional database structures (e.g., relational) to store such large volumes of data can result in data operations that are complex, resource-intensive, and time-consuming. Deployment of multidimensional database structures (e.g., multidimensional data models) facilitates interpretation (e.g., execution) of ever more complex data operations, yet without a commensurate increase in processing overhead. Some multidimensional data models and/or multidimensional analysis techniques (e.g., online analytical processing or OLAP) can facilitate viewing (e.g., by a BI analyst) of a subject dataset in "cubes" that comprise multiple dimensions (e.g., product name, order month, etc.) and various cells (e.g., defined by a combination of dimensions) that hold a value for a particular measure (e.g., sales prices, quantities, etc.).

A subject dataset analyzed using such multidimensional data models might be stored and accessed at a data source (e.g., database table) contained in a respective data storage environment. Given the often large volumes and widely-varying structures (e.g., relational, multidimensional, delimited flat file, semi-structured, document, etc.) of some subject datasets, the data source might be situated within a distributed file system (e.g., Hadoop distributed file system or HDFS), or might be stored in a cloud-based storage system (e.g., Amazon Web Services or AWS), or might be situated in some other data storage environment. While a particular multidimensional data model often specifies a particular data source for operating over the subject dataset, access to alternate data sources comprising other instances of the subject dataset or various subsets of the subject dataset is often desired for various reasons.

Unfortunately, selecting alternate data sources for multidimensional data statements (e.g., queries) can present challenges. As an example, consider the scenario when a developer of multidimensional data models (e.g., cubes) has completed the design and development of a new cube and desires to test its performance. Continuing, it might be that the subject dataset at a subject data source specified by the new cube comprises 100 billion rows. Further, no aggregates of the subject dataset that can be used by the new cube are available (e.g., in the event that the new cube has not yet been published or in use). As such, executing the data statements to test the new cube can consume a significant amount of computing resources, storage resources, networking resources, and/or other resources.

One legacy approach to addressing the foregoing challenges is to design, develop, and publish a version of the new cube that points to an alternate data source, such as a data source that comprises merely a sample (e.g., 0.01%) of the subject dataset. This approach has several shortcomings. Specifically, the development and management of an additional cube version consumes human and computing resources. Such resource consumption is further increased when multiple cube versions that access multiple respective alternate data sources (e.g., 1% sample, 10% sample, etc.) are developed for various users and/or objectives. Also, with the foregoing approach, the cube version being tested is not the cube that will be published for use on the subject dataset at the subject data source. Differences between the actual subject dataset and the smaller sample dataset, and/or differences between the cube versions, might introduce unexpected behaviors that are not exhibited until after publication of the new cube. The foregoing legacy approach is further constrained to just the alternate data sources known to the cube designer at the moment in time the new cube is developed. What is needed is a technological solution that facilitates efficient selection of alternate data sources for data statements that are structured in accordance with a particular multidimensional data model.

More particularly, what is needed is a technique or techniques to improve over legacy techniques and/or over other considered approaches that address efficient selection of alternate data sources for multidimensional data statements. Some of the approaches described in this background section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

The present disclosure provides a detailed description of techniques used in systems, methods, and in computer program products for rule-based data source selection, which techniques advance the relevant technologies to address technological issues with legacy approaches. More specifically, the present disclosure provides a detailed description of techniques used in systems, methods, and in computer program products for real-time selection of data sources using virtual multidimensional data models. Certain embodiments are directed to technological solutions for implementing a virtual multidimensional data model having a data source metadata layer that is populated at data statement execution time to select a data source for one or more data statements.

The disclosed embodiments modify and improve over legacy approaches. In particular, the herein-disclosed techniques provide technical solutions that address the technical problems attendant to efficient selection of alternate data sources for multidimensional data statements. Such technical solutions relate to improvements in computer functionality. Various applications of the herein-disclosed improvements in computer functionality serve to reduce the demand for computer memory, reduce the demand for computer processing power, reduce network bandwidth use, and reduce the demand for inter-component communication. Some embodiments disclosed herein use techniques to improve the functioning of multiple systems within the disclosed environments, and some embodiments advance peripheral technical fields as well. As one specific example, use of the disclosed techniques and devices within the shown environments as depicted in the figures provide advances in the technical field of multidimensional data modeling as well as advances in various technical fields related to exascale distributed database systems.

Further details of aspects, objectives, and advantages of the technological embodiments are described herein and in the drawings and claims.

BRIEF DESCRIPTION OF THE DRAWINGS

The drawings described below are for illustration purposes only. The drawings are not intended to limit the scope of the present disclosure.

DETAILED DESCRIPTION

Figure 1:
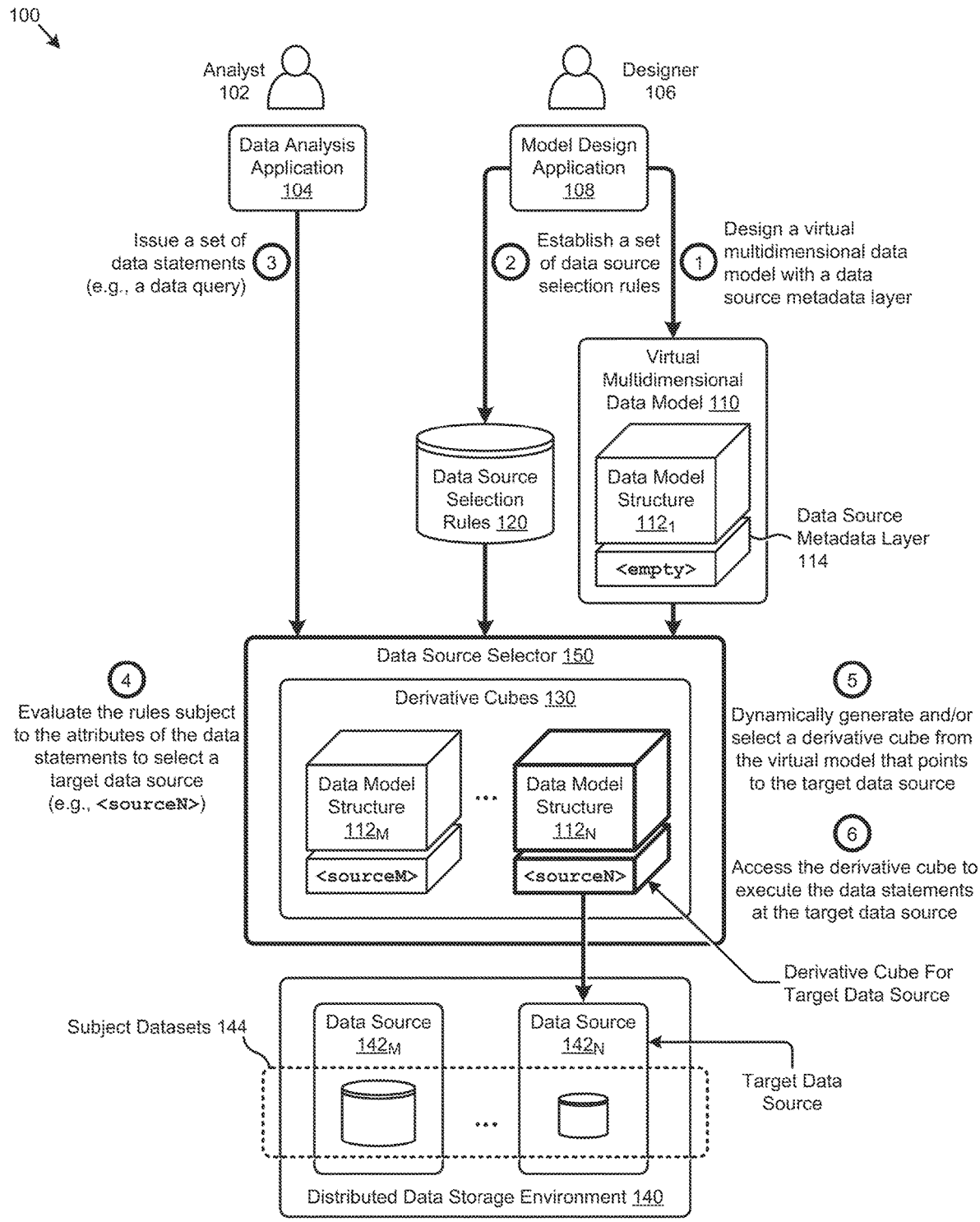
FIG. 1 is a diagram that depicts several implementation techniques pertaining to real-time selection of data sources using virtual multidimensional data models, according to some embodiments.

Embodiments in accordance with the present disclosure address the problem of efficient selection of alternate data sources for multidimensional data statements. Some embodiments are directed to approaches for implementing a virtual multidimensional data model having a data source metadata layer that is populated at data statement execution time to select a data source for one or more data statements. The accompanying figures and discussions herein present example environments, systems, methods, and computer program products for real-time selection of data sources using virtual multidimensional data models.

Overview

Disclosed herein are techniques for implementing a virtual multidimensional data model having a data source metadata layer that is populated at data statement execution time to select a target data source for one or more data statements. In certain embodiments, the virtual multidimensional data model is structured to represent two or more subject datasets that are accessed at respective data sources. Data source selection rules are established to map various data statement attributes to the data sources. The data source selection rules are evaluated subject to data statement attributes derived from issued data statements to dynamically select target data sources for the data statements. Derivative cubes generated from the virtual multidimensional data model codify, in their respective data source metadata layers, a unique set of data source attributes identifying the target data sources.

As merely an example, to facilitate execution of one or more data statements on a dataset at a target data source, a derivative cube that describes the target data source in its data source metadata layer is accessed. In certain embodiments, the derivative cubes are dynamically generated responsive to detecting the data statements. In certain embodiments, the derivative cubes are generated prior to detecting the data statements. In certain embodiments, the data source attributes in the data source metadata layers comprise query engine actions that invoke the generation of any of the subject datasets at the data sources.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

DESCRIPTIONS OF EXAMPLE EMBODIMENTS

FIG. 1 is a diagram that depicts implementation techniques 100 pertaining to real-time selection of data sources using virtual multidimensional data models. As an option, one or more variations of implementation techniques 100 or any aspect thereof may be implemented in the context of the architecture and functionality of the embodiments described herein. The implementation techniques 100 or any aspect thereof may be implemented in any environment.

The diagram shown in FIG. 1 is merely one example representation of the herein disclosed techniques that facilitate real-time selection of data sources for issued data statements. Such data statements might be issued by an analyst 102 from a data analysis application 104 (e.g., BI tool). Analyst 102 might desire to issue the data statements on various subject datasets accessed at a respective set of data sources. For example, as shown in FIG. 1, analyst 102 might issue the data statements on subject datasets 144 across multiple data sources (e.g., data source $142_M$, ..., data source $142_N$) in a distributed data storage environment 140. The distributed data storage environment 140 can represent any combination of data storage environments (e.g., HDFS, AWS, etc.) that facilitate storage of and access to distributed data having various schemata and structural forms. In such data storage environments, a large subject dataset (e.g., a data table with 100 billion rows) is often physically distributed over multiple physical storage devices, but accessed (e.g., queried) as a single logical dataset at a particular data source.

As earlier mentioned, multidimensional data models are often deployed to facilitate issuing data statements (e.g., data queries) on these large subject datasets. The multidimensional data models might be developed by a designer 106 at a model design application 108. These models are then made available (e.g., published) to analyst 102 to facilitate queries on the subject datasets. As is often the case, analyst 102 desires to use a particular multidimensional data model to issue data statements on a variety of datasets at a variety of data sources.

As an example, analyst 102 might be testing a newly published model, and desires to run tests on various small subsets (e.g., 0.01% sample dataset, 1% sample dataset, etc.) of the entire subject dataset so as to quickly receive results. In cases where query execution is metered (e.g., by the amount of data accessed), analyst 102 might also desire a capability to choose an alternate subject dataset at a respective alternate data source (e.g., with lower metering charges). However, selecting a data source for a multidimensional data statements (e.g., data queries) can present challenges. Some legacy approaches implement (e.g., design, develop, publish, etc.) multiple versions of a multidimensional data model (e.g., cube) that each point to one of the possible data sources. With this legacy approach, the development and management of the multiple cube versions consume human and computing resources. Also, differences between the datasets at the various data sources, and/or differences between the cube versions, might introduce unexpected behaviors that are not exhibited until after publication of the cube. The foregoing legacy approach is further constrained to implementing cube versions for merely the data sources known to the cube designer at the moment in time the cube and/or its cube versions are designed.

The herein disclosed techniques address such problems attendant to efficient selection of alternate data sources for multidimensional data statements by implementing a virtual multidimensional data model having a data source metadata layer that is populated at data statement execution time to select a target data source for one or more data statements. In certain embodiments, a data source selector 150 is implemented to facilitate the herein disclosed techniques. Specifically, in the embodiment of FIG. 1, data source selector 150 accesses a virtual multidimensional data model 110 having a data source metadata layer 114 that is designed and developed by designer 106 (operation 1). Virtual multidimensional data model 110 is designed to have a data model structure $112_1$ that represents any of the subject datasets 144 that can be accessed at the data sources in distributed data storage environment 140. A set of data source selection rules 120 are also established (operation 2). Designer 106 and/or other users (e.g., senior analysts, system administrators, etc.) might establish the data source selection rules 120. As shown, data source selector 150 also has access to data source selection rules 120. When one or more data statements (e.g., comprising a data query) are issued (operation 3), data source selector 150 evaluates the data source selection rules 120 subject to various attributes of the data statements to select a target data source for the data statements (operation 4). As an example, data source $142_N$, represented by the identifier "<sourceN>", might be selected as the target data source.

A derivative cube that is derived from virtual multidimensional data model 110 and that points to the target data source is dynamically generated and/or selected (operation 5). In some cases, the derivative cube associated with the target data source does not exist and is generated and selected at data statement execution time. In other cases, the derivative cube associated with the target data source exists in a collection of derivative cubes (e.g., derivative cubes 130) and is selected at data statement execution time. As can be observed, derivative cubes 130 comprise a respective instance (e.g., data model structure $112_M$, ..., data model structure $112_N$) of the data model structure $112_1$ of the virtual multidimensional data model 110. The data source metadata layer of each derivative cube is unique, comprising information (e.g., metadata, attributes, etc.) that describes a particular data source. For example, the data source metadata layers of the shown representative derivative cubes comprise identifying information (e.g., "<sourceM>", ..., "<sourceN>") that corresponds to a respective data source (e.g., data source $142_M$, ..., data source $142_N$) in distributed data storage environment 140. The derivative cube for the target data source is accessed to execute the data statements at the target data source (operation 6).

In comparison to the earlier mentioned legacy approaches, the herein disclosed techniques serve to reduce the demand for computing, storage, and networking resources by dynamically generating derivative cubes from a single published virtual multidimensional data model as compared to generating multiple versions of a cube. Further reductions in computing resources are achieved by the shared data model structure of the derivative cubes and of the published virtual multidimensional data model. Additional efficiencies are achieved by dynamic selection (e.g., at data statement execution time) of data sources not known a priori by designer 106 and/or by analyst 102. Other improvements in computer functionality are facilitated by the herein disclosed techniques.

Figure 2:
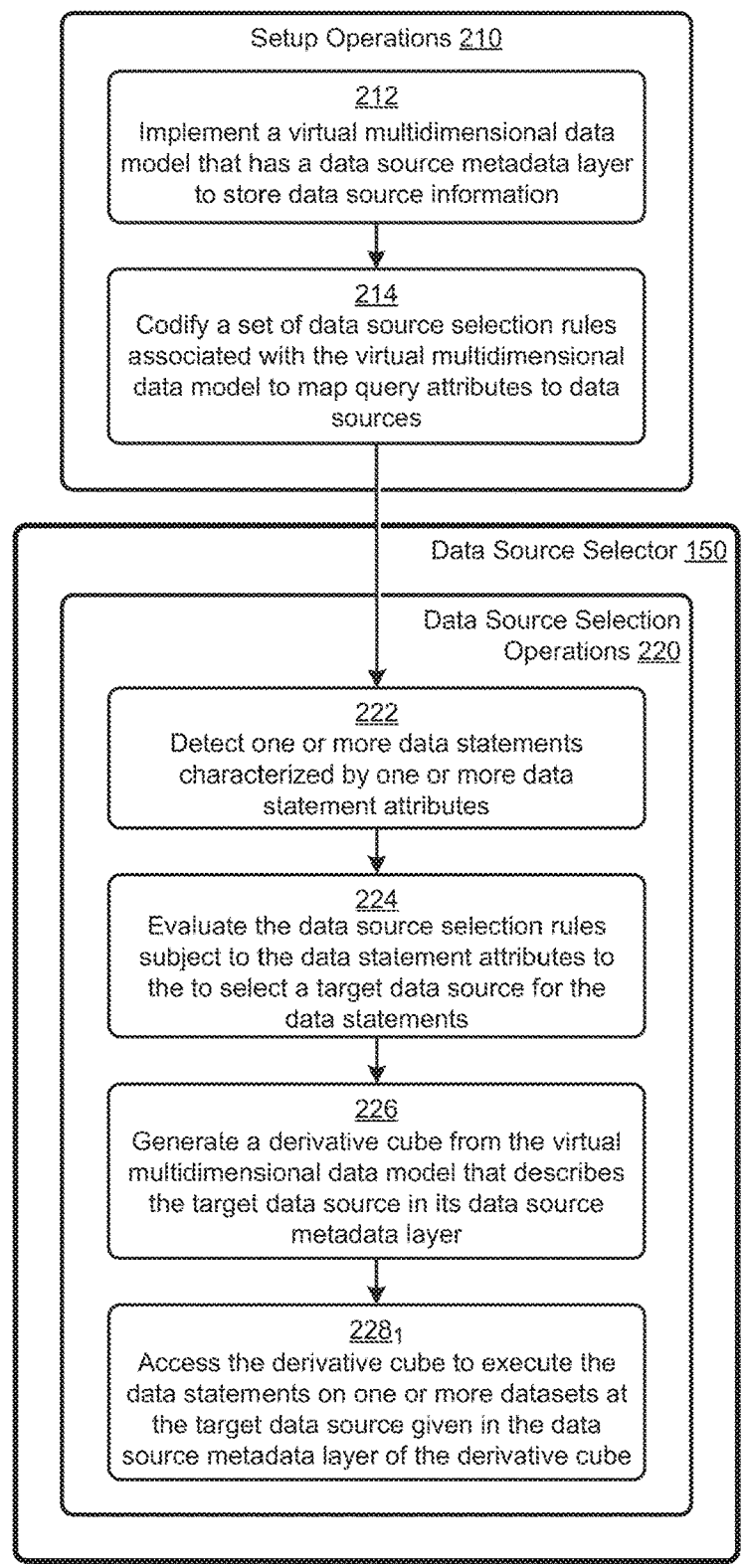
FIG. 2 depicts a rule-based data source selection technique as implemented in systems that facilitate real-time selection of data sources using virtual multidimensional data models, according to some embodiments.

An embodiment of the herein disclosed techniques for rule-based data source selection is shown and described as pertains to FIG. 2.

FIG. 2 depicts a rule-based data source selection technique 200 as implemented in systems that facilitate real-time selection of data sources using virtual multidimensional data models. As an option, one or more variations of rule-based data source selection technique 200 or any aspect thereof may be implemented in the context of the architecture and functionality of the embodiments described herein. The rule-based data source selection technique 200 or any aspect thereof may be implemented in any environment.

The rule-based data source selection technique 200 presents one embodiment of certain steps and/or operations that facilitate real-time selection of data sources using virtual multidimensional data models. As shown, the steps and/or operations can be grouped in a set of setup operations 210 and a set of data source selection operations 220. In certain embodiments, at least the data source selection operations 220 might be performed at data source selector 150.

As illustrated, the setup operations 210 of the rule-based data source selection technique 200 can commence by implementing a virtual multidimensional data model that has a data source metadata layer to store data source information (step 212). For example, the data source metadata layer can be structured to store data source metadata comprising a unique combination of data source attributes that describe a particular data source. A set of data source selection rules associated with the virtual multidimensional data model is codified (e.g., in stored programming code objects) to map certain data statement attributes to one or more data sources (step 214). Other rules corresponding to other virtual models can also be established. In some cases, a particular data source selection rule might be applied to any virtual multidimensional data model.

The data source selection operations 220 shown in FIG. 2 can commence by detecting one or more data statements that is characterized in part by a set of data statement attributes (step 222). Such data statement attributes might be separate from, or derived from, the data statements (e.g., "SELECT" statements, "FROM" statements, etc.). For example, the data statement attributes might describe the user issuing the data statements, the time the data statements are issued, and/or the estimated cost of executing the data statements. The data source selection rules are evaluated subject to the data statement attributes to select a target data source for the data statements (step 224). A derivative cube that describes the target data source in its data source metadata layer is generated from the virtual multidimensional data model (step 226). In some cases, the derivative cube can be dynamically generated in response to detecting data statements issued from a data analysis application. In other cases, the derivative cube might be generated prior to detecting data statements issued from a data analysis application. In any case, the derivative cube is accessed to facilitate execution of the data statements on one or more datasets at the target data source given in the data source metadata layer of the derivative cube (step $228_1$).

Figure 3:
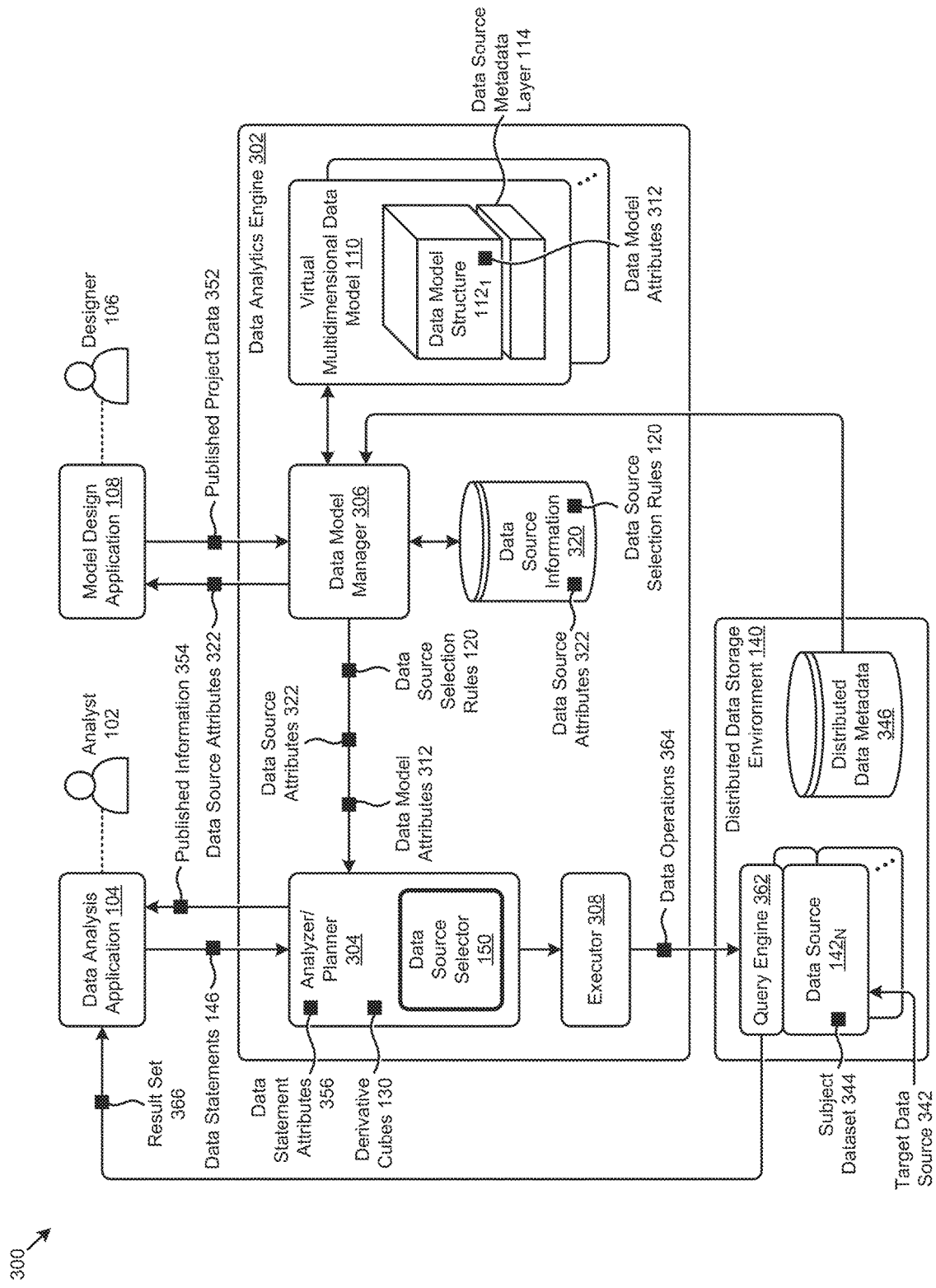
FIG. 3 depicts a block diagram of a data source management system that implements real-time selection of data sources using virtual multidimensional data models, according to an embodiment.

A detailed embodiment of a system and data flows that implement the techniques disclosed herein is presented and discussed as pertains to FIG. 3.

FIG. 3 depicts a block diagram of a data source management system 300 that implements real-time selection of data sources using virtual multidimensional data models. As an option, one or more variations of data source management system 300 or any aspect thereof may be implemented in the context of the architecture and functionality of the embodiments described herein. The data source management system 300 or any aspect thereof may be implemented in any environment.

As shown in the embodiment of FIG. 3, data analysis application 104 and model design application 108 interact with a data analytics engine 302 comprising data source selector 150 to implement real-time selection of data sources from distributed data storage environment 140 using virtual multidimensional data models, according to the herein disclosed techniques. Certain data objects and data flows between components in data source management system 300 that facilitate the herein disclosed techniques are also shown. More specifically, designer 106 interacts with model design application 108 to deliver (e.g., in XML format, JSON format, etc.) a set of published project data 352 to a data model manager 306 at data analytics engine 302. At least a portion of the published project data 352 comprise data records that describe one or more virtual multidimensional data models, such as virtual multidimensional data model 110.

A virtual multidimensional data model comprises attributes that are organized to define one or more logical multidimensional representations of various subject datasets. The logical multidimensional representations facilitate issuing data statements to operate over the subject datasets. As illustrated in data source management system 300, virtual multidimensional data model 110 comprises a data model structure $112_1$ defined in part by a set of data model attributes 312. For example, data model attributes 312 might describe a set of dimensions, measures, relationships (explicit or inferred), and/or other attributes that define the data model structure $112_1$. The data model structure $112_1$ of virtual multidimensional data model 110 constrains the set of feasible representations of the associated subject datasets. The virtual multidimensional data model 110 is herein characterized as "virtual" since the model is an abstracted logical representation of the structures of the underlying subject datasets. For example, virtual multidimensional data model 110 can represent a subject delimited flat file as a multidimensional data cube to facilitate various analyses of the flat file dataset by analyst 102 at data analysis application 104.

The virtual nature of virtual multidimensional data model 110 also characterizes the ability to form any number of derivative cubes from the virtual multidimensional data model to facilitate analyses of various subject datasets. Such derivative cubes are variants of the virtual multidimensional data model that have an underlying data model structure that is shared with the virtual multidimensional data model, but that have varying combinations of the attributes (e.g., dimensions, measures, relationships, etc.) that comprise the data model structure. For example, a virtual multidimensional data model might define both an "Order Year" and an "Order Month" that is mapped to the underlying subject dataset, whereas a first derivative cube might merely represent the "Order Year" while a second derivative cube might merely represent the "Order Month". Further, according to the herein disclosed techniques, such derivative cubes can populate a respective instance of the data source metadata layer 114 of virtual multidimensional data model 110 to facilitate real-time selection of data sources. The data source metadata layer 114 is a portion of metadata that is used to identify a particular data source or a particular set of data sources. For example, data source metadata layer 114 might be structured in an XML format and codify certain data source attributes (e.g., pertaining to a particular data source or a particular set of data sources) within a "<table> . . . </table>" child element.

As can be observed in data source management system 300, such data source attributes (e.g., data source attributes 322) are stored in a set of data source information 320 at the data analytics engine 302. The data source attributes 322 comprise various collections of data records that describe attributes corresponding to respective data sources that are accessible by data analytics engine 302. In some cases, data source attributes 322 are derived in part from a set of distributed data metadata 346 that describes the data sources (e.g., data source $142_N$) and datasets (e.g., subject dataset 344) in distributed data storage environment 140. As shown, data model manager 306 accesses the distributed data metadata 346 to extract the data source attributes 322 and store them in data source information 320 for use by the data source management system 300. In some embodiments, certain portions of data source attributes 322 might be updated often by data model manager 306 in response to reallocation of datasets (e.g., to facilitate resource balancing) within distributed data storage environment 140. For example, while the "name" of a data source might remain unchanged, the "location" (e.g., URL) of the data source might be updated to reflect a migration of a dataset to another physical storage node.

A set of data source selection rules 120 are also stored in data source information 320. A set of rules (e.g., rule base) such as data source selection rules 120 comprises data records storing various information that can be used to form one or more constraints to apply to certain functions and/or operations. For example, the information pertaining to a rule in the rule base might comprise the conditional logic operands (e.g., input variables, conditions, constraints, etc.) and/or operators (e.g., "if", "then", "and", "or", "greater than", "less than", etc.) for forming a conditional logic statement that returns one or more results. For example, according to the herein disclosed techniques, certain inputs (e.g., one or more data statement attributes) are applied to data source selection rules 120 to select a target data source for one or more data statements, which target data source is described in the data source metadata layer of a particular derivative cube that is used to develop and/or execute the data statements. In some cases, data source selection rules 120 might be specified by designer 106 and delivered to data model manager 306 in the published project data 352. As shown, data source attributes 322 might be accessed by designer 106 at model design application 108 to facilitate development of the data source selection rules 120. Other contributors to the data source selection rules 120 are possible. For example, experienced analysts, system administrators, enterprise policy managers, and/or other power users might contribute to the development of the rules.

To facilitate the herein disclosed techniques, data model manager 306 delivers, or otherwise provides access to, data model attributes 312, data source attributes 322, data source selection rules 120, and/or other information to an analyzer/planner 304 at data analytics engine 302. As can be observed, data source selector 150 is implemented at analyzer/planner 304. In some cases, data source selector 150 evaluates the foregoing delivered information to generate one or more derivative cubes (e.g., derivative cubes 130). For example, designer 106 might define certain data source selection rules so as to automatically generate a set of derivative cubes for a respective set of data sources upon publication of the underlying virtual multidimensional data model. In this case, the derivative cubes might be generated prior to detecting any data statements issued from a data analysis application. For example, one or more derivative cubes might be generated based on one or more planned data statements rather than issued data statements. Analyzer/planner 304 presents to data analysis application 104 the published information 354 that analyst 102 is authorized to access. Such published information might describe the virtual multidimensional data models, earlier generated derivative cubes, data sources, and/or other entities that are available to analyst 102 to facilitate issuance of data statements 146. Data statements, such as data statements 146, can comprise data definition language (DDL) statements, data manipulation language (DML) statements (e.g., data queries), transaction control statements, session control statements, system control statements, embedded statements, and/or other structured programming code to operate over one or more datasets. In the embodiments described herein, the data statements are structured to operate over one or more of the derivative cubes which logically represent a respective one or more datasets at the distributed data storage environment 140.

When one or more of the data statements 146 are detected at data source selector 150, they are analyzed to determine a set of data statement attributes 356 associated with the queries. Data statement attributes, such as data statement attributes 356, are a collection of data records that comprise information pertaining to a particular set of data statements. As earlier mentioned, such data statement attributes might be separate from, or derived from, the data statements (e.g., "SELECT" statements, "FROM" statements, etc.). For example, the data statement attributes might describe the user issuing the data statements, the time the data statements are issued, or the estimated cost of executing the data statements. One or more of the data statement attributes can be consulted to facilitate and/or constrain certain operations performed at data analytics engine 302. Specifically, as implemented by the herein disclosed techniques, one or more of the data statement attributes 356 can be applied as inputs to the data source selection rules 120 to select a target data source for the data statements, which target data source is described in the data source metadata layer of a particular derivative cube that is used to develop and/or execute the data statements. In some cases, the derivative cube that points to the target data source is generated at data statement execution time, while in other cases, the derivative cube is generated prior to detecting the data statements.

In all cases, at some moment in time, the data statements and the derivative cube associated with the target data source selected for the data statements are identified, and further processing at analyzer/planner 304 can commence. Specifically, the analyzer/planner 304 can analyze the characteristics of the data statements and derivative cube to determine a strategy and structure (e.g., joins, unions, sequencing, aggregations, etc.) for a set of data operations (e.g., "physical plan") that can be issued by an executor 308 to a query engine that serves the target data source. For example, if data source $142_N$ in distributed data storage environment 140 is identified as a target data source 342 for a particular set of data statements that identify a subject dataset 344, data operations 364 that conform to a certain structure (e.g., language) that can be interpreted by a query engine 362 are issued by executor 308. The results from the issued data operations are returned to data analysis application 104 in a result set 366. Analyzer/planner 304 and/or data source selector 150 can perform many other operations. For example, analyzer/planner 304 can determine an estimate of the time to execute certain data statements (e.g., a data query), an estimate of the cost to execute the data statements, and/or other information that might be used by data source selector 150 to facilitate the herein disclosed techniques.

The specific example of a data source management system shown in FIG. 3 is purely exemplary, and other systems and/or subsystems and/or partitions and/or data objects and/or data flows are reasonable. One embodiment of a computing environment for implementing such systems, subsystems, partitions, data objects, and/or data flows is shown and described as pertaining to FIG. 4.

Figure 4:
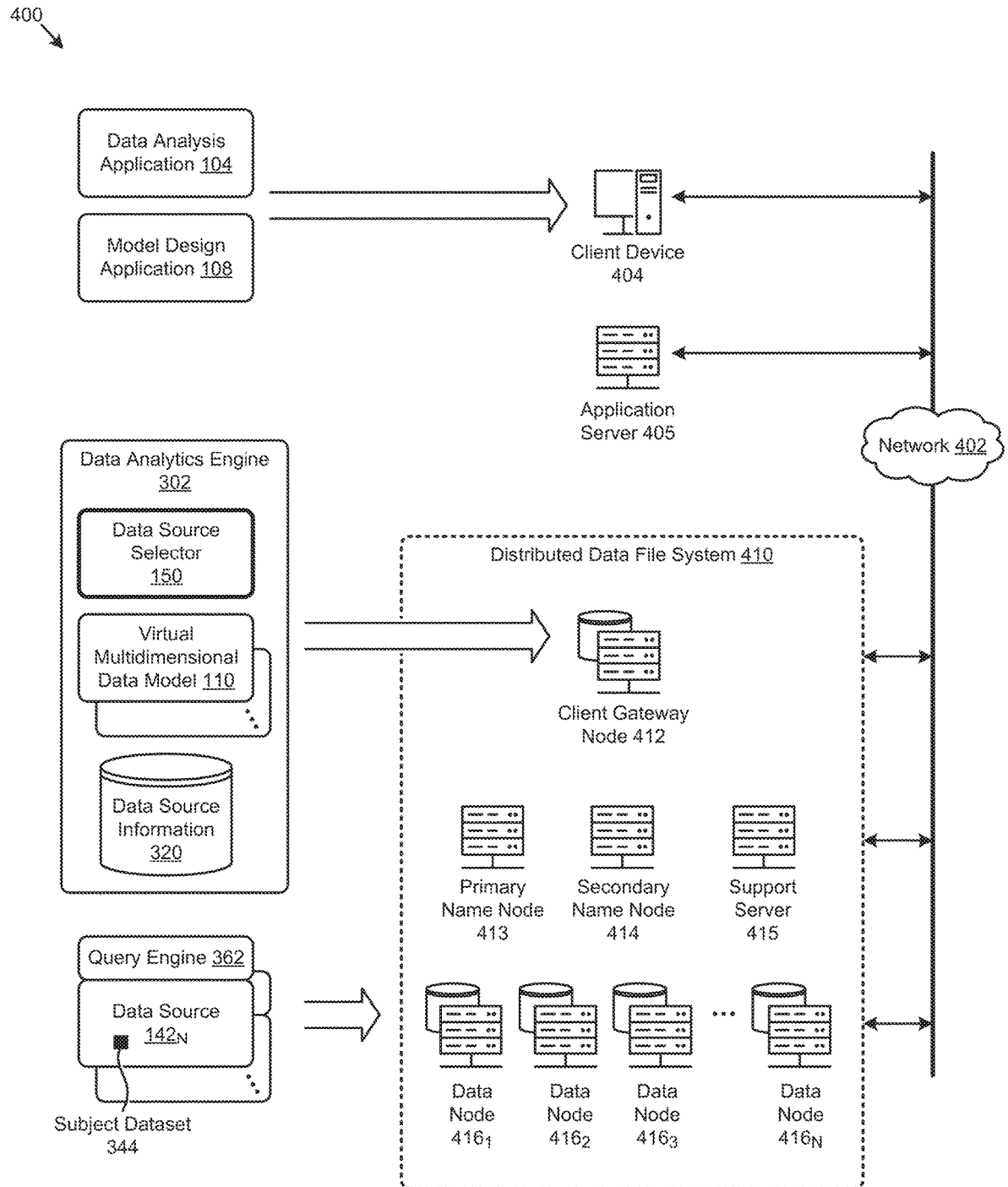
FIG. 4 is a schematic of a computing environment suitable for implementing real-time selection of data sources using virtual multidimensional data models, according to an embodiment.

FIG. 4 is a schematic of a computing environment 400 suitable for implementing real-time selection of data sources using virtual multidimensional data models. As an option, one or more variations of computing environment 400 or any aspect thereof may be implemented in the context of the architecture and functionality of the embodiments described herein. The computing environment 400 or any aspect thereof may be implemented in any environment.

As shown in FIG. 4, computing environment 400 comprises one or more instances of client device 404 (e.g., a desktop computer, laptop computer, mobile phone, etc.), one or more instances of an application server 405, and one or more instances of a distributed data file system 410. The aforementioned devices, servers, and systems can communicate through a network 402 (e.g., a wireless network, a wide area network (WAN), a local area network (LAN), the Internet, an intranet, a private network, etc.). The shown architecture of distributed data file system 410 can facilitate storage and processing of large volumes of data (e.g., in an HDFS framework).

Specifically, the architecture of distributed data file system 410 comprises one or more instances of a client gateway node 412, one or more instances of a primary name node 413, one or more instances of a secondary name node 414, one or more instances of a support server 415 (e.g., executing data analysis processes, etc.), and a plurality of data nodes (e.g., data node $416_1$, data node $416_2$, data node $416_3$, . . . , data node $416_N$). In some implementations, distributed data file system 410 can store large datasets that are physically distributed across multiple computing devices (e.g., the plurality of data nodes) rather than store the datasets entirely on a single computing device comprising a large amount of storage capacity.

To accommodate such distributed storage, the plurality of data nodes can be configured with one or more rack-mounted servers coupled (e.g., by SATA or SAS interconnects) to multiple solid-state drives (SSDs) and/or hard disk drives (HDDs) for storing the data. As an example, when a file is loaded into distributed data file system 410, it is replicated and partitioned (e.g., sharded) into "blocks" of data, which are distributed and stored across the plurality of data nodes. The primary name node 413 is responsible for storage and management of metadata associated with the data and/or other entities associated with distributed data file system 410 such that, for example, the primary name node 413 can provide data location information for data processing operations. More specifically, to facilitate the herein disclosed techniques, primary name node 413 can provide certain data source attributes (e.g., URL, name, schema, etc.) for various data sources in distributed data file system 410 that are codified in the data source metadata layer of derivative cubes generated from virtual multidimensional data models.

Other configurations, partitions, and architectures of distributed data file system 410 shown in computing environment 400 are possible. For example, a single-node implementation may have all of the nodes (e.g., client gateway node 412, primary name node 413, the plurality of data nodes, etc.) reside on a single computing device. Also, a small cluster of two nodes may have a first computing device operate as a name node and a second computing device operate as a data node. Distributed data file system 410 can represent any data storage environment.

In one or more embodiments, the aforementioned devices, servers, and systems in computing environment 400 can be configured to implement techniques for real-time selection of data sources using virtual multidimensional data models, as described herein. As can be observed, certain components earlier described for implementing the herein disclosed techniques are mapped to client device 404 and distributed data file system 410 of computing environment 400. More specifically, as shown, the client device 404 can store program instructions corresponding to the operations of data analysis application 104 and/or model design application 108. Further, client gateway node 412 can store program instructions corresponding to the operations of an instance of the data analytics engine 302 that comprises data source selector 150, a plurality of virtual multidimensional data models (e.g., virtual multidimensional data model 110), and/or other components. Data source information 320 accessed by data analytics engine 302 can also be stored in a storage facility (e.g., one or more SSDs and/or HDDs) coupled to client gateway node 412. The plurality of data nodes can comprise various query engines (e.g., query engine 362) that communicate with a set of data sources (e.g., data source $142_N$) to operate over certain datasets (e.g., subject dataset 344) accessible at the data sources.

Figure 5:
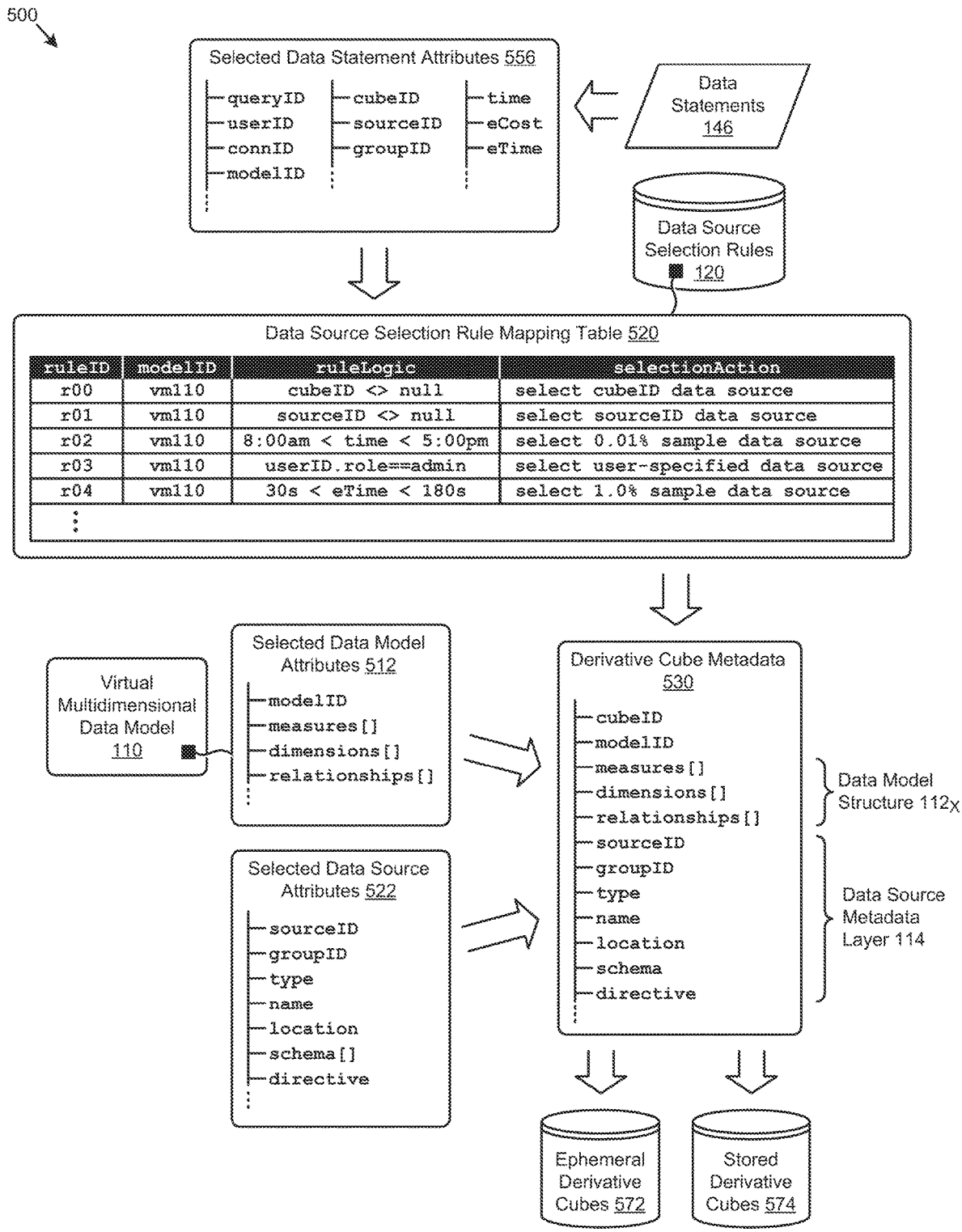
FIG. 5 depicts specialized data structures that improve the way a computer stores and retrieves data when selecting data sources, according to an embodiment.

A detailed embodiment of the data structures of the various data objects described herein is presented and discussed as pertains to FIG. 5.

FIG. 5 depicts specialized data structures 500 that improve the way a computer stores and retrieves data when selecting data sources. As an option, one or more variations of specialized data structures 500 or any aspect thereof may be implemented in the context of the architecture and functionality of the embodiments described herein. The specialized data structures 500 or any aspect thereof may be implemented in any environment.

The specialized data structures 500 shown in FIG. 5 are merely one representation of the structures of certain data objects that are implemented to facilitate the herein disclosed techniques. Certain relationships between the specialized data structures 500 are also illustrated in FIG. 5. The data comprising the data objects represented by specialized data structure 500 can be organized and/or stored using various techniques. As can be observed, certain data statement attributes derived from data statements (e.g., data statements 146) can comprise the attributes depicted in a set of selected data statement attributes 556. The selected data statement attributes 556 associate various attributes to a particular data statement or set of data statements (e.g., data query). For example, selected data statement attributes 556 might be organized and/or stored in a tabular structure (e.g., relational database table) that has rows corresponding to a particular data query and columns corresponding to various attributes pertaining to that data query. As another example, selected data statement attributes 556 might be organized and/or stored in a programming code object that has instances corresponding to a particular data query and properties corresponding to the various attributes pertaining to that data query.

In any case, as depicted in selected data statement attributes 556, a particular set (e.g., table row or object instance)

of data statement attributes might describe a query identifier (e.g., stored in a "queryID" field), a user identifier (e.g., stored in a "userID" field), a connection identifier (e.g., stored in a "connID" field), a virtual multidimensional data model identifier (e.g., stored in a "model ID" field), a derivative cube identifier (e.g., stored in a "cube ID" field), a data source identifier (e.g., stored in a "sourceID" field), a data source group identifier (e.g., stored in a "groupID" field), a timestamp (e.g., stored in a "time" field), an estimated execution cost (e.g., stored in a "eCost" field), an estimated execution time (e.g., stored in a "eTime" field), and/or other data statement attributes.

As described herein, one or more data statement attributes (e.g., selected data statement attributes 556) can be applied to a set of data source selection rules to determine one or more target data sources for a particular set of data statements. The data source selection rules can be codified in various structures such as programming code logic, anonymous functions (e.g., lambda expressions), mapping tables, lookup tables, and/or other structures.

As can be observed in FIG. 5, a data source selection rule mapping table 520 illustrates a mapping of data statement attributes to data source selection actions. More specifically, data source selection rule mapping table 520 depicts a representative set of rules (e.g., from data source selection rules 120) associated with a certain virtual multidimensional model identified by entries in a "model ID" column as "vm110". Each of the representative rules are identified by entries in a "ruleID" column. Pseudo code in a "ruleLogic" column describes the evaluation technique (e.g., method, function, etc.) that is performed on the data statement attributes for a respective rule. In the example rules shown in data source selection rule mapping table 520, when the expression in the "ruleLogic" evaluates to "true", the corresponding (e.g., in the same table row) action in the "selectionAction" column is performed. For example, rule "r00" checks whether a derivative cube was specified in a query (e.g., "cubeID< >null") and if so, selects the data source of the specified "cubeID" as the target data source for the data statements. As another example, rule "r04" checks whether the estimated data statement execution time is between 30 seconds and 180 seconds (e.g., "30 s<eTime<180 s") and if so, selects a target data source that contains a 1.0% sample dataset.

The data source selection actions determined according to the data source selection rules 120 are combined with selected data model attributes 512 (e.g., of virtual multidimensional data model 110) and selected data source attributes 522 (e.g., of a target data source) to generate a derivative cube characterized by a set of derivative cube metadata 530. As shown, the data structure comprising the selected data model attributes 512 associates a model identifier (e.g., stored in a "modelID" field) of a particular virtual multidimensional data model with a set of measures (e.g., stored in a "measures [ ]" object), a set of dimensions (e.g., stored in a "dimensions [ ]" object), a set of relationships (e.g., stored in a "relationships [ ]" object), and/or other attributes. Further, the data structure comprising the selected data source attributes 522 associates a data source identifier (e.g., stored in a "sourceID" field) of a particular data source with a data source group identifier (e.g., stored in a "groupID" field), a data source type (e.g., "0.01% sample" stored in a "type" field), a data source name (e.g., stored in a "name" field), a data source location (e.g., a URL or IP address stored in a "location" field), a schema of the dataset at the data source (e.g., stored in a "schema [ ]" object), a query engine directive (e.g., stored in a "directive" field), and/or other attributes. As an example, the query engine directive might comprise statements that are issued to a query engine at a data source to create a sample dataset.

Instances of the selected data model attributes 512 and the selected data source attributes 522 pertaining to a particular set of data statements and/or a particular target data source are combined in the derivative cube metadata 530 that characterizes a derivative cube identified in a "cubeID" field. As illustrated, the portion of the "measures [ ]", "dimensions [ ]", and "relationships [ ]" objects from selected data model attributes 512 that are codified in derivative cube metadata 530 comprise an instance (e.g., data model structure $112_X$) of the data model structure of virtual multidimensional data model 110. Further, an instance of the selected data source attributes 522 pertaining to a data source associated with the derivative cube is codified in the data source metadata layer 114 of derivative cube metadata 530. In some cases, the derivative cubes generated according to the herein disclosed techniques are stored in persistent storage as a set of stored derivative cubes 574. For example, the stored derivative cubes 574 might be accessible until manually deleted by a system administrator. In other cases, the generated derivative cubes are handled as ephemeral derivative cubes 572. In these cases, access to the ephemeral derivative cubes 572 might be terminated when certain derivative cube termination events are detected. For example, a derivative cube termination event might be triggered when a derivative cube is not accessed for some period of time, or when the data model structure of the associated virtual multidimensional data model is modified (e.g., by a model designer).

Figure 6:
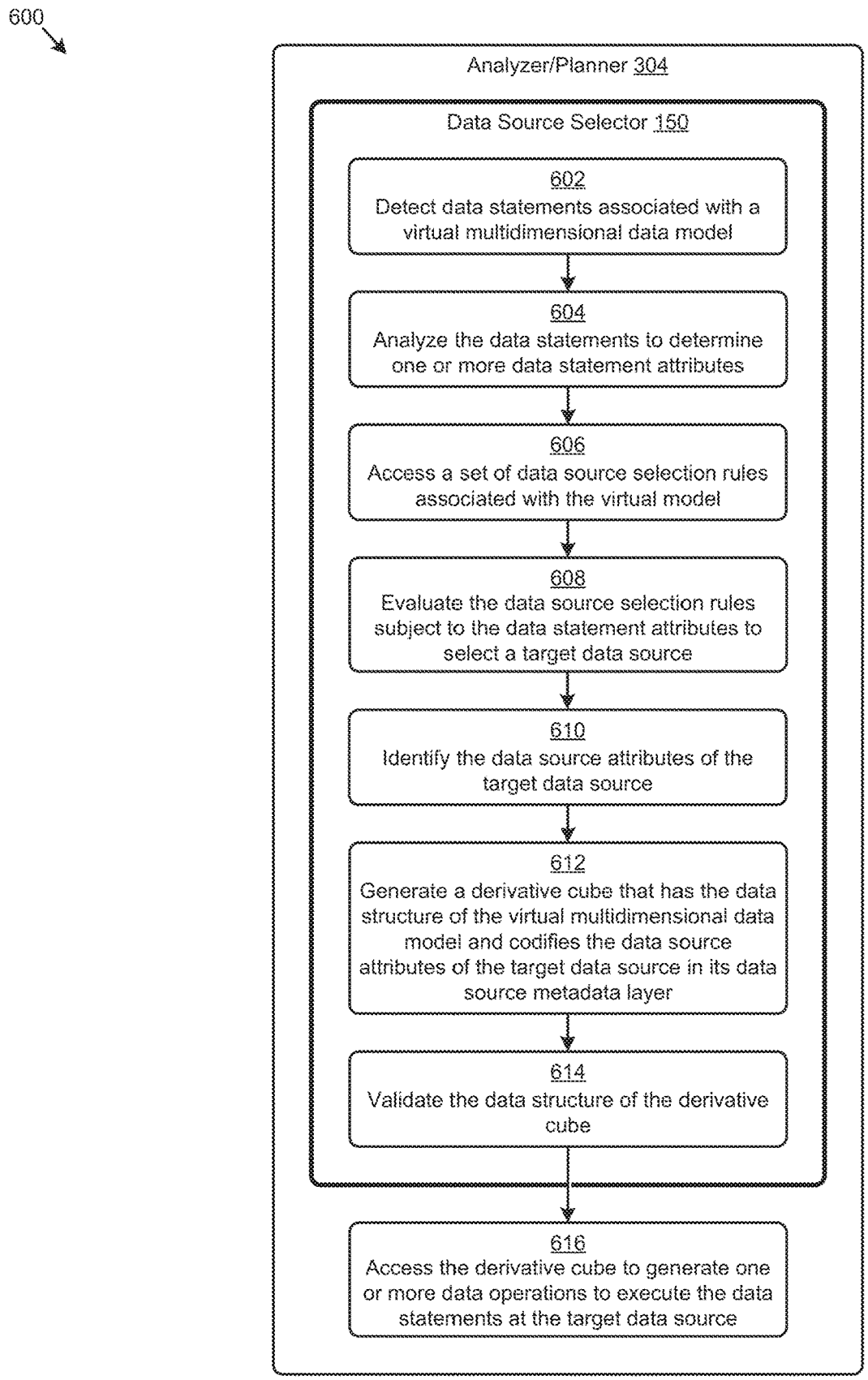
FIG. 6 exemplifies a derivative cube generation technique as implemented in systems that facilitate real-time selection of data sources using virtual multidimensional data models, according to an embodiment.

Further details pertaining to the generation of derivative cubes according to the herein disclosed techniques is shown and described as pertains to FIG. 6.

FIG. 6 exemplifies a derivative cube generation technique 600 as implemented in systems that facilitate real-time selection of data sources using virtual multidimensional data models. As an option, one or more variations of derivative cube generation technique 600 or any aspect thereof may be implemented in the context of the architecture and functionality of the embodiments described herein. The derivative cube generation technique 600 or any aspect thereof may be implemented in any environment.

The derivative cube generation technique 600 presents one embodiment of certain steps and/or operations that generate derivative cubes from virtual multidimensional data models to facilitate real-time selection of data sources. In certain embodiments, derivative cube generation technique 600 can be implemented at data source selector 150 and analyzer/planner 304 as illustrated. The derivative cube generation technique 600 can commence by detecting one or more data statements associated with a certain virtual multidimensional data model (step 602). The data statements are analyzed to determine one or more data statement attributes (step 604). A set of data source selection rules also associated with the virtual multidimensional data model are accessed (step 606). The data source selection rules are evaluated subject to the data statement attributes derived from the data statements to select a target data source (step 608). In some cases, a rule might be a query-agnostic rule in that the rule identifies a certain target data source for any and all combinations of data statement attributes. For example, a model designer might identify a target data source associated with a 0.01% sample dataset prior to detecting any data statements issued from a data analysis application.

When the target data source is selected, the data source attributes for the target data source are identified (step 610). A derivative cube derived from the virtual multidimensional data model that codifies the data source attributes in its data source metadata layer is generated (step 612). The data model structure of the derivative cube is validated for compliance with the data model structure of the virtual multidimensional data model (step 614). The generated derivative cube can then be accessed to generate one or more data operations that execute the data statements at the target data source (step 616).

As discussed herein, various users (e.g., designers, developers, analysts, etc.) can participate in certain ways in the selection of data sources as facilitated by the herein disclosed techniques. Scenarios describing such participation and techniques are presented and discussed in FIG. 7A and FIG. 7B.

Figure 7A:
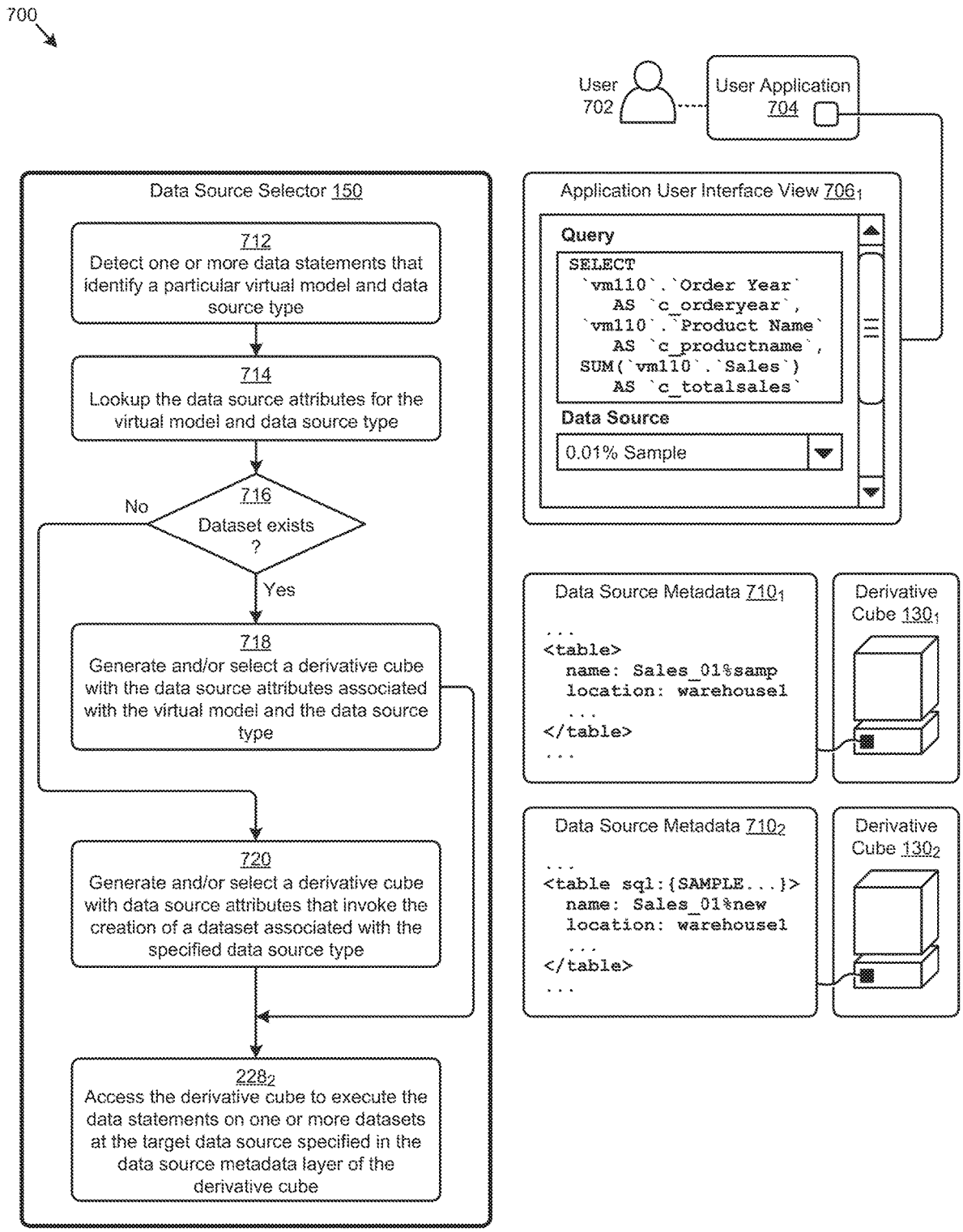
FIG. 7A and FIG. 7B are diagrams showing data source selection scenarios as implemented in systems that facilitate real-time selection of data sources using virtual multidimensional data models, according to an embodiment.
Figure 7B:
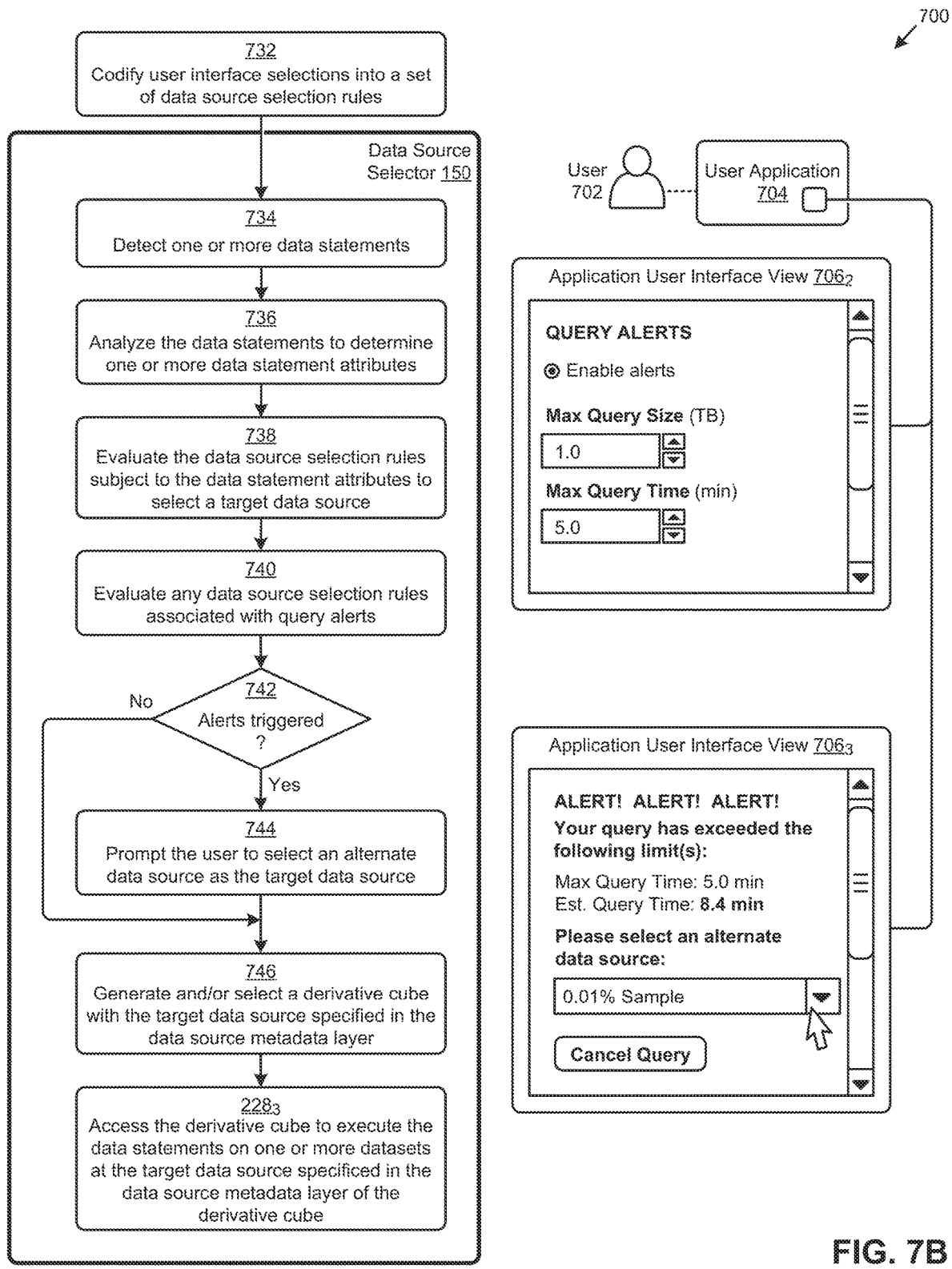

FIG. 7A and FIG. 7B are diagrams showing data source selection scenarios 700 as implemented in systems that facilitate real-time selection of data sources using virtual multidimensional data models. As an option, one or more variations of data source selection scenarios 700 or any aspect thereof may be implemented in the context of the architecture and functionality of the embodiments described herein. The shown data source selection scenarios 700 or any aspect thereof may be implemented in any environment.

The data source selection scenarios 700 in FIG. 7A and FIG. 7B present certain embodiments of steps and/or operations that facilitate real-time selection of data sources, according to the herein disclosed techniques. Various illustrations are also presented to illustrate the techniques implemented in data source selection scenarios 700. In certain embodiments, at least some of the steps and/or operations pertaining to data source selection scenarios 700 can be performed at data source selector 150 as illustrated in FIG. 7A and FIG. 7B. Referring to the scenario in FIG. 7A, one or more data statements for a particular virtual multidimensional data model and data source type are detected (step 712). For example, as shown in an application user interface view 706$_1$, a user 702 at a user application 704 might issue certain data statements that are structured to comprise a data query that identifies a virtual multidimensional data model named "vm110" to be executed on a data source type described by "0.01% Sample". The data source attributes associated with the combination of the virtual model and data source type are identified in a lookup operation (step 714). In certain embodiments, the virtual model identifier and the data source type serve as the data statement attributes that are applied to a set of data source selection rules to invoke the lookup operation.

If the results of the data source attributes lookup indicate an appropriate dataset (e.g., 0.01% sample dataset) exists at the data source (see "Yes" path of decision 716), then a derivative cube with the data source attributes (e.g., in its data source metadata layer) associated with the virtual model and the data source type is generated and/or selected (step 718). For example, in this case, a derivative cube 130$_1$ with data source metadata 710$_1$ describing a data source named "Sales_01%samp" at location "warehouse1" might be generated and/or selected. If the dataset does not exist (see "No" path of decision 716), then a derivative cube with data source attributes (e.g., in its data source metadata layer) that invoke the creation of a dataset associated with the specified data source type is generated and/or selected (step 720). As shown in FIG. 7A, for example, a derivative cube 130$_2$ with data source metadata 710$_2$ that comprises a query engine directive (e.g., SQL "SAMPLE" statement) to create a 0.01% sample dataset named "Sales_01%new" might be generated and/or selected. Such datasets created in real-time (e.g., by query engine directives) can be ephemeral (e.g., dataset is created, used, and then deleted) or persistent (e.g., dataset is created and stored for some time period). The generated and/or selected derivative cube is accessed to facilitate execution of the earlier detected data statements at the target data source given in the data source metadata layer of the derivative cube (step 228$_2$).

Referring to the scenario in FIG. 7B, certain user interface selections can be codified into a set of data source selection rules (step 732). For example, user 702 might interact with an application user interface view 706$_2$ at user application 704 to enable query alerts, and establish a maximum data access size (e.g., "1.0" TB) and a maximum data statement execution time (e.g., "5.0" minutes) that are codified in various rules. When one or more data statements are detected (step 734), the data statements are analyzed to determine one or more data statement attributes (step 736). The data source selection rules are evaluated subject to the data statement attributes to select a target data source (step 738).

For the then-current target data source, certain data source selection rules associated with query alerts can be evaluated (step 740). If any query alerts are triggered by the evaluation of the data source selection rules (see "Yes" path of decision 742), the user is prompted to select an alternate data source as the target data source (step 744). For example, as shown in an application user interface view 706$_3$, an alert can be presented that indicates the estimated query time (e.g., "8.4 min") exceeds the established maximum threshold (e.g., "5.0 min") established in the data source selection rules. The user is also prompted to select an alternate data source, such as a data source associated with "0.01% Sample" dataset. Further, the user is presented with a "Cancel Query" button that can be clicked to cancel the query. Even when no alerts are triggered, a "Cancel Query" button and/or another technique can be provided to cancel a query. If no alerts are triggered (see "No" path of decision 742) or an alternate data source is selected as the target data source, a derivative cube that identifies the target data source in its data source metadata layer is generated and/or selected (step 746). The derivative cube identifying the target data source is accessed to facilitate execution of the data statements at the target data source given in the data source metadata layer of the derivative cube (step 228$_3$).

ADDITIONAL EMBODIMENTS OF THE DISCLOSURE

Additional Practical Application Examples

Figure 8:
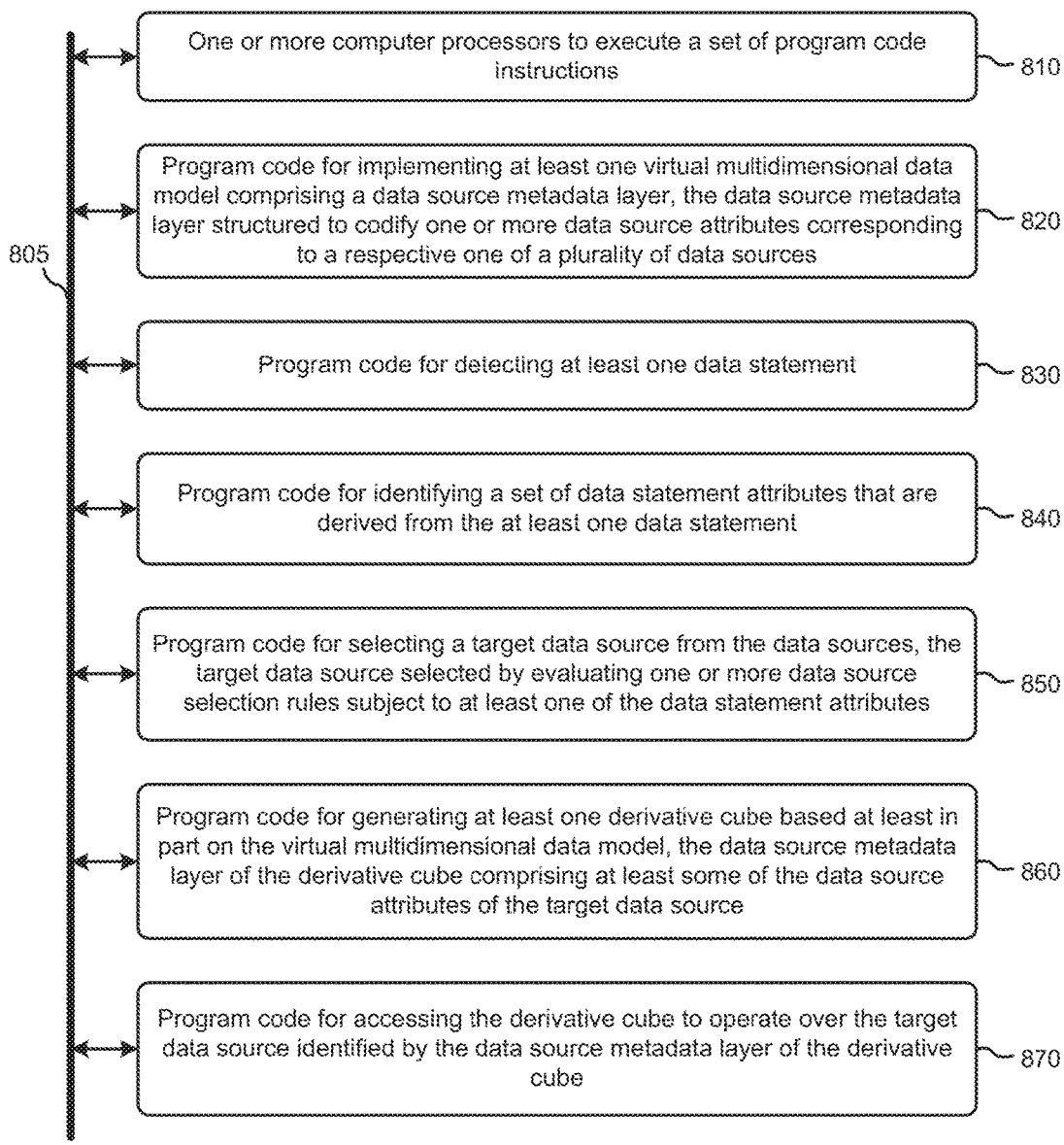
FIG. 8 depicts system components as arrangements of computing modules that are interconnected so as to implement certain of the herein-disclosed embodiments.

FIG. 8 depicts a system 800 as an arrangement of computing modules that are interconnected so as to operate cooperatively to implement certain of the herein-disclosed embodiments. This and other embodiments present particular arrangements of elements that, individually and/or as combined, serve to form improved technological processes that address efficient selection of alternate data sources for multidimensional data statements. The partitioning of system 800 is merely illustrative and other partitions are possible. As an option, the system 800 may be implemented in the context of the architecture and functionality of the embodiments described herein. Of course, however, the system 800 or any operation therein may be carried out in any desired environment. The system 800 comprises at least one processor and at least one memory, the memory serving to store program instructions corresponding to the operations of the system. As shown, an operation can be implemented in whole or in part using program instructions accessible by a module. The modules are connected to a communication path 805, and any operation can communicate with other operations over communication path 805. The modules of the system can, individually or in combination, perform method operations within system 800. Any operations performed within system 800 may be performed in any order unless as may be specified in the claims. The shown embodiment implements a portion of a computer system, presented as system 800, comprising a computer processor to execute a set of program code instructions (module 810) and modules for accessing memory to hold program code instructions to perform: implementing at least one virtual multidimensional data model comprising a data source metadata layer, the data source metadata layer structured to codify one or more data source attributes corresponding to a respective one of a plurality of data sources (module 820); detecting at least one data statement (module 830); identifying a set of data statement attributes that are derived from the at least one data statement (module 840); selecting a target data source from the data sources, the target data source selected by evaluating one or more data source selection rules subject to at least one of the data statement attributes (module 850); generating at least one derivative cube based at least in part on the virtual multidimensional data model, the data source metadata layer of the derivative cube comprising at least some of the data source attributes of the target data source (module 860); and accessing the derivative cube to operate over the target data source identified by the data source metadata layer of the derivative cube (module 870).

Variations of the foregoing may include more or fewer of the shown modules. Certain variations may perform more or fewer (or different) steps, and/or certain variations may use data elements in more, or in fewer (or different) operations.

Figure 9A:
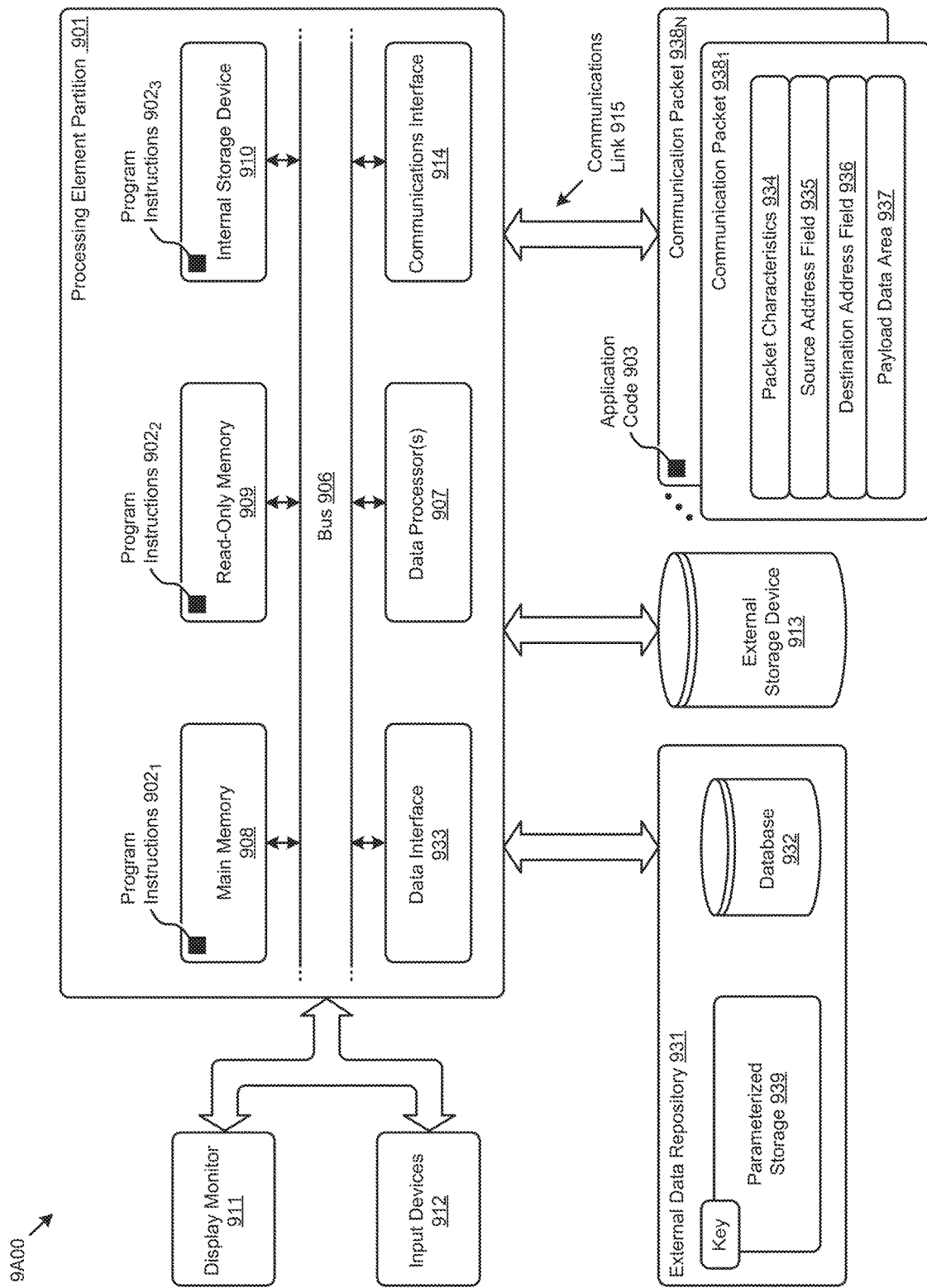
FIG. 9A and FIG. 9B present block diagrams of computer system architectures having components suitable for implementing embodiments of the present disclosure, and/or for use in the herein-described environments.

Still further, some embodiments include variations in the operations performed, and some embodiments include variations of aspects of the data elements used in the operations.
System Architecture Overview Additional System Architecture Examples FIG. 9A depicts a block diagram of an instance of a computer system 9A00 suitable for implementing embodiments of the present disclosure. Computer system 9A00 includes a bus 906 or other communication mechanism for communicating information. The bus interconnects subsystems and devices such as a CPU, or a multi-core CPU (e.g., data processor 907), a system memory (e.g., main memory 908, or an area of random access memory (RAM)), a non-volatile storage device or non-volatile storage area (e.g., read-only memory or ROM 909), an internal storage device 910 or external storage device 913 (e.g., magnetic or optical), a data interface 933, a communications interface 914 (e.g., PHY, MAC, Ethernet interface, modem, etc.). The aforementioned components are shown within processing element partition 901, however other partitions are possible. The shown computer system 9A00 further comprises a display 911 (e.g., CRT or LCD), various input devices 912 (e.g., keyboard, cursor control), and an external data repository 931.

According to an embodiment of the disclosure, computer system 9A00 performs specific operations by data processor 907 executing one or more sequences of one or more program code instructions contained in a memory. Such instructions (e.g., program instructions $902_1$, program instructions $902_2$, program instructions $902_3$, etc.) can be contained in or can be read into a storage location or memory from any computer readable/usable medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 9A00 performs specific networking operations using one or more instances of communications interface 914. Instances of the communications interface 914 may comprise one or more networking ports that are configurable (e.g., pertaining to speed, protocol, physical layer characteristics, media access characteristics, etc.) and any particular instance of the communications interface 914 or port thereto can be configured differently from any other particular instance. Portions of a communication protocol can be carried out in whole or in part by any instance of the communications interface 914, and data (e.g., packets, data structures, bit fields, etc.) can be positioned in storage locations within communications interface 914, or within system memory, and such data can be accessed (e.g., using random access addressing, or using direct memory access DMA, etc.) by devices such as data processor 907.

The communications link 915 can be configured to transmit (e.g., send, receive, signal, etc.) any types of communications packets (e.g., communications packets $938_1$, communications packets $938_N$) comprising any organization of data items. The data items can comprise a payload data area 937, a destination address 936 (e.g., a destination IP address), a source address 935 (e.g., a source IP address), and can include various encodings or formatting of bit fields to populate the shown packet characteristics 934. In some cases, the packet characteristics include a version identifier, a packet or payload length, a traffic class, a flow label, etc. In some cases, the payload data area 937 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 907 for execution. Such a medium may take many forms including, but not limited to, non-volatile media and volatile media. Non-volatile media includes, for example, optical or magnetic disks such as disk drives or tape drives. Volatile media includes dynamic memory such as a random access memory.

Common forms of computer readable media include, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 931, which in turn can be formatted into any one or more storage areas, and which can comprise parameterized storage 939 accessible by a key (e.g., filename, table name, block address, offset address, etc.).

Execution of the sequences of instructions to practice certain embodiments of the disclosure are performed by a single instance of the computer system 9A00. According to certain embodiments of the disclosure, two or more instances of computer system 9A00 coupled by a communications link 915 (e.g., LAN, PTSN, or wireless network) may perform the sequence of instructions required to practice embodiments of the disclosure using two or more instances of components of computer system 9A00.

The computer system 9A00 may transmit and receive messages such as data and/or instructions organized into a data structure (e.g., communications packets). The data structure can include program instructions (e.g., application code 903), communicated through communications link 915 and communications interface 914. Received program code may be executed by data processor 907 as it is received and/or stored in the shown storage device or in or upon any other non-volatile storage for later execution. Computer system 9A00 may communicate through a data interface 933 to a database 932 on an external data repository 931. Data items in a database can be accessed using a primary key (e.g., a relational database primary key).

The processing element partition 901 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 907. Some embodiments include one or more special-purpose hardware components (e.g., power control, logic, sensors, transducers, etc.). A module may include one or more state machines and/or combinational logic used to implement or facilitate the operational and/or performance characteristics pertaining to data access authorization for dynamically generated database structures.

Various implementations of the database 932 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of data access authorization for dynamically generated database structures). Such files or records can be brought into and/or stored in volatile or non-volatile memory.

Figure 9B:
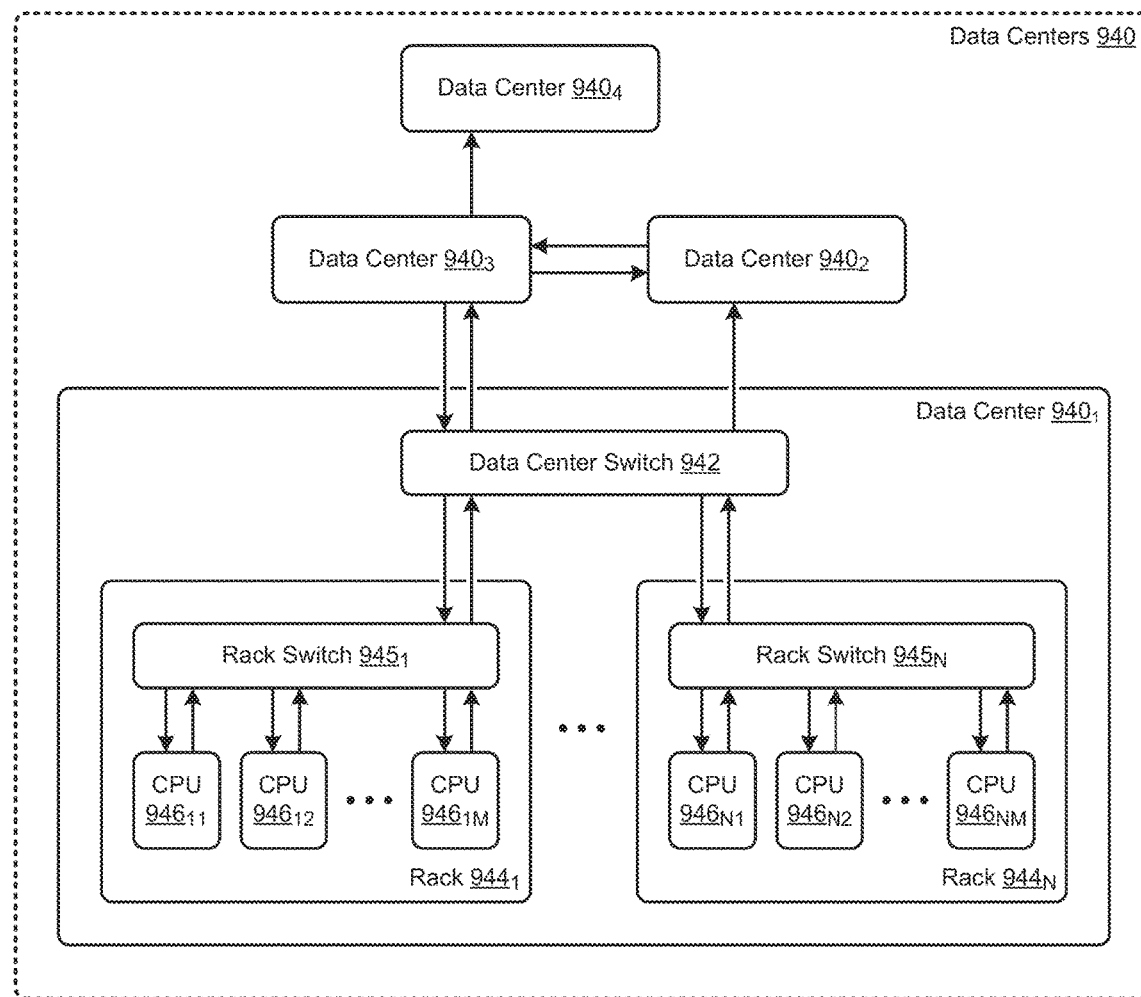

FIG. 9B depicts a block diagram of an instance of a distributed data processing system 9B00 that may be included in a system implementing instances of the herein-disclosed embodiments.

Distributed data processing system 9B00 can include many more or fewer components than those shown. The distributed data processing system 9B00 can be used to store data, perform computational tasks, and/or transmit data between a plurality of data centers 940 (e.g., data center 940$_1$, data center 940$_2$, data center 940$_3$, and data center 940$_4$). The distributed data processing system 9B00 can include any number of data centers. Some of the plurality of data centers 940 might be located geographically close to each other, while others might be located far from the other data centers.

The components of distributed data processing system 9B00 can communicate using dedicated optical links and/or other dedicated communication channels, and/or supporting hardware such as modems, bridges, routers, switches, wireless antennas, wireless towers, and/or other hardware components. In some embodiments, the component interconnections of the distributed data processing system 9B00 can include one or more wide area networks (WANs), one or more local area networks (LANs), and/or any combination of the foregoing networks. In certain embodiments, the component interconnections of the distributed data processing system 9B00 can comprise a private network designed and/or operated for use by a particular enterprise, company, customer, and/or other entity. In other embodiments, a public network might comprise a portion or all of the component interconnections of the distributed data processing system 9B00.

In some embodiments, each data center can include multiple racks that each include frames and/or cabinets into which computing devices can be mounted. For example, as shown, data center 940$_1$ can include a plurality of racks (e.g., rack 944$_1$, . . . , rack 944$_N$), each comprising one or more computing devices. More specifically, rack 944$_1$ can include a first plurality of CPUs (e.g., CPU 946$_{11}$, CPU 946$_{12}$, . . . , CPU 946$_{1M}$), and rack 944$_N$ can include an Nth plurality of CPUs (e.g., CPU 946$_{N1}$, CPU 946$_{N2}$, . . . , CPU 946$_{NM}$). The plurality of CPUs can include data processors, network attached storage devices, and/or other computer controlled devices. In some embodiments, at least one of the plurality of CPUs can operate as a master processor, controlling certain aspects of the tasks performed throughout the distributed data processing system 9B00. For example, such master processor control functions might pertain to scheduling, data distribution, and/or other processing operations associated with the tasks performed throughout the distributed data processing system 9B00. In some embodiments, one or more of the plurality of CPUs may take on one or more roles, such as a master and/or a slave. One or more of the plurality of racks can further include storage (e.g., one or more network attached disks) that can be shared by one or more of the CPUs.

In some embodiments, the CPUs within a respective rack can be interconnected by a rack switch. For example, the CPUs in rack 944$_1$ can be interconnected by a rack switch 945$_1$. As another example, the CPUs in rack 944$_N$ can be interconnected by a rack switch 945$_N$. Further, the plurality of racks within data center 940$_1$ can be interconnected by a data center switch 942. The distributed data processing system 9B00 can be implemented using other arrangements and/or partitioning of multiple interconnected processors, racks, and/or switches. For example, in some embodiments, the plurality of CPUs can be replaced by a single large-scale multiprocessor.

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method for rule-based data source selection, the method comprising:
   implementing at least one virtual multidimensional data model comprising a data source metadata layer, the data source metadata layer structured to codify one or more data source attributes corresponding to a respective one of a plurality of data sources;
   detecting at least one data statement, the data statement indicative of a query of data defined by the multidimensional data model;
   identifying a set of data statement attributes that are derived from the at least one data statement;
   selecting a target data source from the data sources, the target data source selected by evaluating one or more data source selection rules based on at least one of the data statement attributes, such that one or more data statement attributes corresponding to the data statement are associated with a derivative cube identifier and at least one of, a query identifier, a user identifier, a connection identifier, a virtual multidimensional data model identifier, a data source identifier, a data source group identifier, a timestamp, an estimated execution cost, or an estimated execution time;
   determining if the evaluation of the data source selection rules triggers an alert pertaining to an outcome of the query based on the selected target data sources, and if so,
      rendering an indication of the alert and an opportunity for selection of an alternate data statement for satisfying the data source selection rules;
   generating at least one derivative cube based at least in part on the virtual multidimensional data model, the data source metadata layer of the derivative cube comprising at least some of the data source attributes of the target data source, the derivative cube corresponding to the derivative cube identifier, the derivative cube indicative of a data source based on an evaluation of the data source selection rules for providing access to the indicated data source; and
   accessing the derivative cube to operate over the target data source identified by the data source metadata layer of the derivative cube, the derivative cube further comprising a first derivative cube and a second derivative cube, each having a corresponding derivative cube identifier, wherein the first derivative cube is indicative of values derived from a data source different than a data source that the second derivative cube is indicative of.

2. The method of claim 1, wherein at least one of, selecting the target data source, or generating the derivative cube, is performed in response to detecting the data statement.

3. The method of claim 2, wherein the data statement is issued from a data analysis application.

4. The method of claim 2, wherein the data statement is a planned data statement.

5. The method of claim 1, wherein a data model structure of at least one of, the virtual multidimensional data model, or the derivative cube, represents one or more subject datasets at the data sources.

6. The method of claim 5, further comprising validating that the data model structure of the derivative cube represents at least one of the subject datasets.

7. The method of claim 1, wherein the data source attributes comprise at least one query engine directive that is interpreted by a query engine to perform one or more operations.

8. The method of claim 7, wherein at least one of the operations generates one or more subject datasets at the target data source.

9. The method of claim 1, wherein the data source attributes describe at least one of, a data source identifier, a data source group identifier, a data source type, a data source name, a data source location, a schema of one or more subject datasets at the target data source, or a query engine directive.

10. The method of claim 1, further comprising:
    evaluating a rule of the data source selection rules;
    determining that one of the first derivative cube and the second derivative cube satisfies the evaluated data source selection rule; and
    invoking the data source corresponding to the determined derivative cube.

11. The method of claim 1 wherein evaluating further comprises evaluating a data source selection rule mapping table using the data statement attributes;
    identifying rules in the data source selection rule mapping table pertaining to the data statement attributes based on rule logic contained in each rule of the identified rules; and
    initiating an action called for by the identified rules.

12. The method of claim 1 further comprising:
    receiving the data statements from selections of a user interface; and
    prompting a user for a selection of an alternate target data source based on the triggered alert.

13. The method of claim 1 further comprising:
    evaluating a data source selection rule pertaining to time or memory requirements imposed by the data statements; and
    concluding that the time or memory imposed by the data statements triggers an alert called for in the evaluated data source selection rule.

14. A computer readable medium, embodied in a non-transitory computer readable medium, the non-transitory computer readable medium having stored thereon a sequence of instructions which, when stored in memory and executed by one or more processors causes the one or more processors to perform a set of acts for rule-based data source selection, the method the acts comprising:
    implementing at least one virtual multidimensional data model comprising a data source metadata layer, the data source metadata layer structured to codify one or more data source attributes corresponding to a respective one of a plurality of data sources;
    detecting at least one data statement, the data statement indicative of a query of data defined by the multidimensional data model;
    identifying a set of data statement attributes that are derived from the at least one data statement;
    selecting a target data source from the data sources, the target data source selected by evaluating one or more data source selection rules based on at least one of the data statement attributes, such that one or more data statement attributes corresponding to the data statement are associated with a derivative cube identifier and at least one of, a query identifier, a user identifier, a connection identifier, a virtual multidimensional data model identifier, a data source identifier, a data source group identifier, a timestamp, an estimated execution cost, or an estimated execution time;

determining if the evaluation of the data source selection rules triggers an alert pertaining to an outcome of the query based on the selected target data sources, and if so,
  rendering an indication of the alert and an opportunity for selection of an alternate data statement for satisfying the data source selection rules;

generating at least one derivative cube based at least in part on the virtual multidimensional data model, the data source metadata layer of the derivative cube comprising at least some of the data source attributes of the target data source, the derivative cube corresponding to the derivative cube identifier, the derivative cube indicative of values derived from a data source based on an evaluation of the data source selection rules for providing access to the indicated data source; and accessing the derivative cube to operate over the target data source identified by the data source metadata layer of the derivative cube, the derivative cube further comprising a first derivative cube and a second derivative cube, each having a corresponding derivative cube identifier, wherein the first derivative cube is indicative of a data source different than a data source that the second derivative cube is indicative of.

15. The computer readable medium of claim 14, wherein at least one of, selecting the target data source, or generating the derivative cube, is performed in response to detecting the data statement.

16. The computer readable medium of claim 15, wherein the data statement is issued from a data analysis application.

17. The computer readable medium of claim 15, wherein the data statement is a planned data statement.

18. The computer readable medium of claim 14, wherein a data model structure of at least one of, the virtual multidimensional data model, or the derivative cube, represents one or more subject datasets at the data sources.

19. The computer readable medium of claim 18, further comprising instructions which, when stored in memory and executed by the one or more processors causes the one or more processors to perform acts of validating that the data model structure of the derivative cube represents at least one of the subject datasets.

20. The computer readable medium of claim 14, wherein the data source attributes comprise at least one query engine directive that is interpreted by a query engine to perform one or more operations.

21. The computer readable medium of claim 20, wherein at least one of the operations generates one or more subject datasets at the target data source.

22. A computer system having encoded instructions executable by a processor for performing a method of rule-based data source selection, the method comprising:

a storage medium having stored thereon a sequence of instructions; and one or more processors that execute the instructions to cause the one or more processors to perform a set of acts, the acts comprising,
  implementing at least one virtual multidimensional data model comprising a data source metadata layer, the data source metadata layer structured to codify one or more data source attributes corresponding to a respective one of a plurality of data sources;
  detecting at least one data statement, the data statement indicative of a query of data defined by the multidimensional data model;
  identifying a set of data statement attributes that are derived from the at least one data statement;
  selecting a target data source from the data sources, the target data source selected by evaluating one or more data source selection rules subject to at least one of the data statement attributes, such that one or more data statement attributes corresponding to the data statement are associated with a derivative cube identifier and at least one of, a query identifier, a user identifier, a connection identifier, a virtual multidimensional data model identifier, a data source identifier, a data source group identifier, a timestamp, an estimated execution cost, or an estimated execution time;
  determining if the evaluation of the data source selection rules triggers an alert pertaining to an outcome of the query based on the selected target data sources, and if so,
    rendering an indication of the alert and an opportunity for selection of an alternate data statement for satisfying the data source selection rules;
  generating at least one derivative cube based at least in part on the virtual multidimensional data model, the data source metadata layer of the derivative cube comprising at least some of the data source attributes of the target data source, the derivative cube corresponding to the derivative cube identifier, the derivative cube indicative of a data source based on an evaluation of the data source selection rules for providing access to the indicated data source; and
  accessing the derivative cube to operate over the target data source identified by the data source metadata layer of the derivative cube, the derivative cube further comprising a first derivative cube and a second derivative cube, each having a corresponding derivative cube identifier, wherein the first derivative cube is indicative of values derived from a data source different than a data source that the second derivative cube is indicative of.

23. The system of claim 22, wherein at least one of, selecting the target data source, or generating the derivative cube, is performed in response to detecting the data statement.

* * * * *